United States Patent [19]

Neasham

[11] 4,118,951

[45] Oct. 10, 1978

[54] DRIVE UNIT FOR SELECTIVELY EFFECTING DRIVING OR FREE-WHEELING CONDITION OF PROPELLER SHAFTING

[76] Inventor: Leo B. Neasham, Rte. 2, Box 605L, Highlands, N.C. 28741

[21] Appl. No.: 820,069

[22] Filed: Jul. 28, 1977

[51] Int. Cl.² .............................. F16C 1/06; F16C 1/26
[52] U.S. Cl. ............................................. 64/4; 64/24; 180/70 P; 180/73 R; 403/26
[58] Field of Search .................... 64/4, 24, 15 R, 15 B; 180/70 R, 73 R, 70 P; 403/26, 293, 341

[56] References Cited

U.S. PATENT DOCUMENTS

| 678,588 | 7/1901 | Ryter et al. ............................. 403/26 |
| 1,312,296 | 8/1919 | Apple ..................................... 64/15 R |
| 1,353,029 | 9/1920 | Coleman ................................ 180/73 R |
| 1,992,815 | 2/1935 | Craney ................................... 180/70 R |
| 2,147,879 | 2/1939 | Burmeister .............................. 403/26 |
| 3,064,493 | 11/1962 | Popovich et al. .................... 180/70 R |
| 3,155,187 | 11/1964 | DeLorean .......................... 180/70 P |
| 3,197,552 | 7/1965 | Flair ....................................... 64/15 R |
| 3,282,365 | 11/1966 | McReynolds .......................... 180/27 |
| 3,286,487 | 11/1966 | Esperson ............................... 64/1 R |
| 3,344,618 | 10/1967 | Young ........................................ 64/4 |
| 3,543,536 | 12/1970 | Rekow ....................................... 64/4 |
| 4,027,502 | 6/1977 | Stuemky .............................. 64/15 R |

FOREIGN PATENT DOCUMENTS

| 14,576 | 10/1933 | Australia ................................. 64/15 B |
| 766,710 | 7/1934 | France ................................. 180/73 R |
| 917,318 | 1/1947 | France ................................... 64/15 R |
| 532,052 | 8/1931 | Fed. Rep. of Germany ................ 64/4 |
| 667,082 | 11/1938 | Fed. Rep. of Germany ........... 403/379 |
| 482,916 | 4/1938 | United Kingdom ..................... 403/379 |
| 521,458 | 5/1940 | United Kingdom ...................... 180/73 |

Primary Examiner—Leslie Braun
Attorney, Agent, or Firm—Karl W. Flocks

[57] ABSTRACT

A drive unit for selectively effecting driving or free-wheeling condition of propeller shafting in a motor vehicle comprising a drive unit for attachment to and/or attached to spaced-apart portions of an automobile propeller shaft for selectively establishing drive relationship or free-wheeling relationship between the propeller shaft portions as desired including:

(a) an elongate first member for extending for at least the full distance between adjacent ends of portions of a propeller shaft;

(b) a second member with first bearing members in supporting relationship between the second member and one part of the first member;

(c) a third member with additional bearing members in supporting relationship between the third member and a second part of the first member;

(d) first coupling structure for selectively locking or unlocking the first member along with the second member to or from one portion of a propeller shaft;

(e) second coupling structure for selectively locking or unlocking the first member along with the third member to or from a second portion of a propeller shaft whereby free-wheeling between portions of a propeller shaft may be effected when either of the coupling structures is conditioned to unlock the parts associated therewith while a driving relationship may be established between parts of a propeller shaft when both of coupling structures are conditioned to lock the parts associated therewith.

10 Claims, 6 Drawing Figures

DRIVE UNIT FOR SELECTIVELY EFFECTING DRIVING OR FREE-WHEELING CONDITION OF PROPELLER SHAFTING

BACKGROUND OF THE INVENTION

1. Field of the Invention

The field of the invention is believed to be exemplified by art which may be found in Class 64, Subclasses 1 and 2; Class 180, Subclass 70P; and Class 403, Subsclasses 26, 293, and 341 of the United States Patent Office Classification System.

2. Description of the Prior Art

Prior to preparing the instant application for his invention applicant effected a preliminary search in an endeavor to locate the most relevant prior art. In the course of the preliminary search the following patents were considered to be the most relevant prior art noted: U.S. Pat. Nos. 408,953 — Chivill; 678,588 — Ryder et al; 1,020,906 — Hess; 1,907,960 — Guillet; 2,251,031 — Boxeman, Jr., 2,530,094 — Stearns; 3,065,009 — Austin; 3,155,187 — De Lorean; 3,286,487 — Esperson; 3,301,011 — Dye et al; 3,507,129 — Tarenskeen.

Of the above De Lorean was noted as being of interest only in that it discloses a drive shaft supported on spaced apart bearings in a tube. In FIG. 17 of De Lorean an intermediate shaft 70 is connected to shaft 20 through flanges 66, 72. De Lorean mentions in column 10, lines 52-56 the requirement of a drive clutch between the engine and the shaft to disengage the engine from drive shaft 20.

The Chivill and Hess patents were noted as being of interest in that they show tubular shaft portions with a male shaft disposed therein and secured thereto by bolts. The Ryder et al patent was noted as being of interest in that it shows two tubular shaft A sections operably associated with a shaft C with bearing members C' therebetween. The Guillet, Bozeman, and Stearns patents were noted as being of interest in that they show axially spaced-apart shaft sections with tubular portions coupled together by an intermediate coupling shaft dispersed therein. The Austin, Esperson, Dye et al and Tarenskeen patents were noted as being of interest in that they show shaft coupling arrangements which are secured together by removable transversely extending pin or like elements.

As the present invention is believed to be distinguishable over the art discussed above, the instant application has been prepared and submitted for examination.

SUMMARY OF THE INVENTION

The present invention relates to a propeller shaft for a motor vehicle comprising two axially spaced-apart portions and an intermediate portion which is disposed between the spaced-apart portions to be selectively connected thereto so as to provide a driving effect between the spaced-apart portions or connected in rotable relationship with either or both of the spaced-apart portions so as to provide a free-wheeling effect between the spaced-apart portions. The novelty of the present invention in part at least resides in its structural association with and as part of a propeller shaft. The present invention was conceived by applicant as a result of his interest in antique automobiles which have been purchased at shows or sales in various geographical locales and were towed for great distances to applicant's residence. Where automobiles must be towed there is a reverse driving effect on the transmission which drive usually initiates at the rear wheels which roll along the ground, proceeds through the rear axle, the differential gearing, the propeller shaft and then to the primary transmission, it being understood, of course, that towing is performed with the primary transmission conditioned to neutral with the clutch disengaged. Even with the primary transmission conditioned to neutral, the reverse drive effected thereto through the propeller shaft is undesirable, particularly if towing is more than just the few miles to the nearest garage in emergency situations. The undesirable loading imposed upon the primary transmission would be further exacerbated where the transmission is that of an antique vehicle, one that has not been driven and is possibly low in effective lubrication insofar as the bearings and transmission gear contact surfaces are concerned.

With the foregoing in mind the present invention, which relates to a modified propeller shaft and means for modifying a propeller hsaft, has been conceived to effect towing a vehicle without imposing a load on the primary transmission thereof.

Another object of the present invention is to provide a new and improved propeller shaft arrangement in a motor vehicle which can selectively effect driving conditions between the primary transmission and the driven ground wheels or to establish free-wheeling conditions at the propeller shaft between the primary transmission and the differential transmission.

Still another object of the present invention is to provide modular unit which permits modification of an existing propeller shaft and be readily incorporated with the remains of the original propeller shaft as and to be modified.

A further object of the present invention is to provide a new and improved method of towing a motor vehicle whereby the drive connection between the differential transmission and the primary transmission by way of the propeller shaft may be avoided.

With the foregoing objects and the background of the invention clearly in mind, the reader will readily and fully understand and appreciate the various features and aspects of the present invention in terms of an assembled system, a subcombination, and even as a method of attaining the objects, particularly with due regard for the accompanying drawings considered in conjunction with description and claims.

DETAILED DESCRIPTION OF A PREFERRED EMBODIMENT

Figure 1:
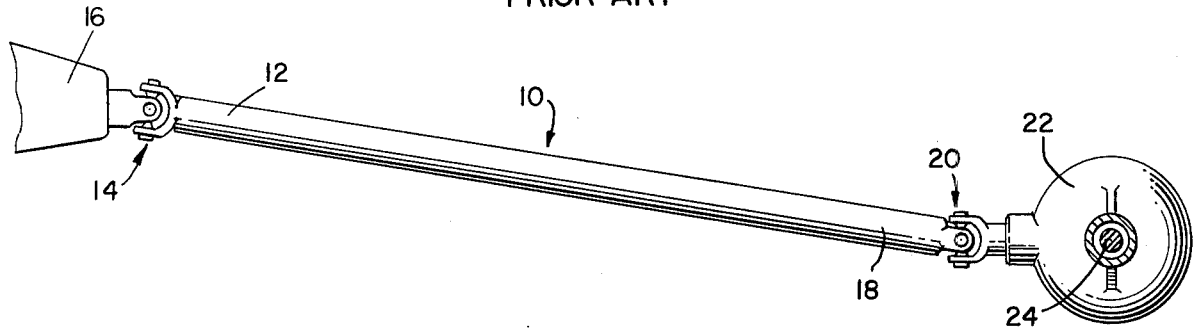
FIG. 1 represents a side elevational view of a conventional propeller shaft as assembled with associated parts in a conventional automobile.

Referring now to the drawings in greater particularity, a conventional propeller shaft 10 of a conventional automobile is connected at a first end 12 by way of a first universal joint or coupling 14 to a primary transmission 16, which includes gearing selectively engaged with and disengaged from the engine. Propeller shaft 10 is connected at a second end 18 by way of a second universal joint or coupling 20 to a secondary or differential transmission 22 driving a pair output wheel axles 24. The conventional propeller shaft 10 of FIG. 1 which, as can be readily understood, will be effective provide drive to the wheels of axles 24 from primary transmission 16 through universal joint 14, propeller shaft 10 itself, universal joint 20, differential transmission 22, and axles 24, obviously will conversely be effective to provide a drive to primary transmission 16 from ground wheels on axles 24 when the vehicle thereof is towed.

To adapt propeller shaft 10 for modification according to the present invention an intermediate portion of propeller shaft 10 between portions 12 and 18 is removed in any suitable manner. Applicant has found it expeditious for his purpose to cut off the intermediate portion of shaft 10 by a cutting torch to leave a gap designated 10' in FIG. 2 between the remains of end portions 12 and 18 of the former one-piece propeller shaft 10.

Figure 2:
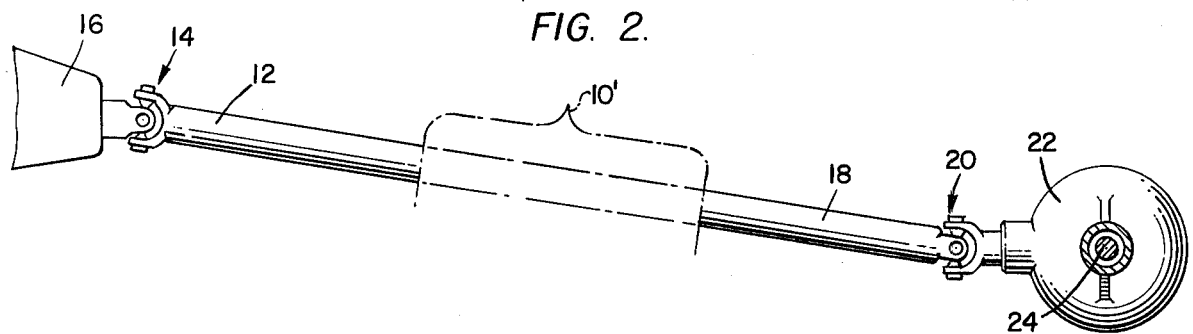
FIG. 2 represents a view similar of the propeller shaft of FIG. 1 with an intermediate portion cut off and removed for modification of the remaining portions according to the instant invention.

A preassembled modular drive unit 26 to replace the cut-off intermediate portion leaving the gap 10' in FIG. 2 is illustrated as installed between remaining end portions 12 and 18 and incorporated therewith to form the completed modified propeller shaft 28.

Figure 3:
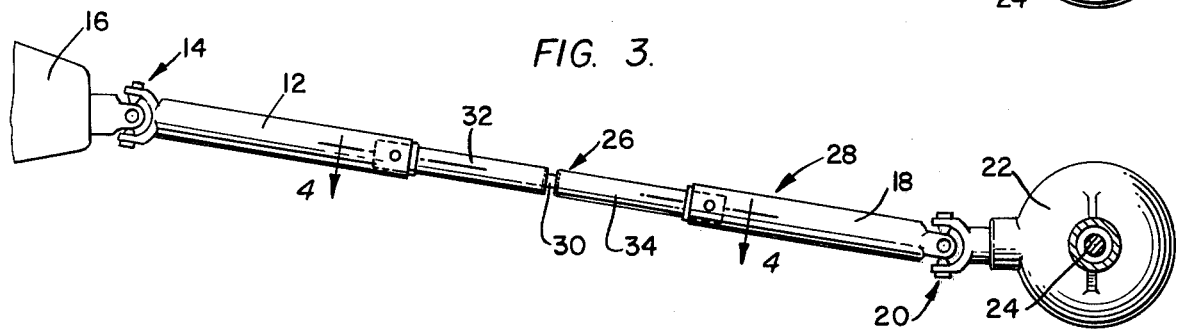
FIG. 3 is a view similar to FIG. 1 of a propeller shaft modified according to the present invention.
Figure 4:
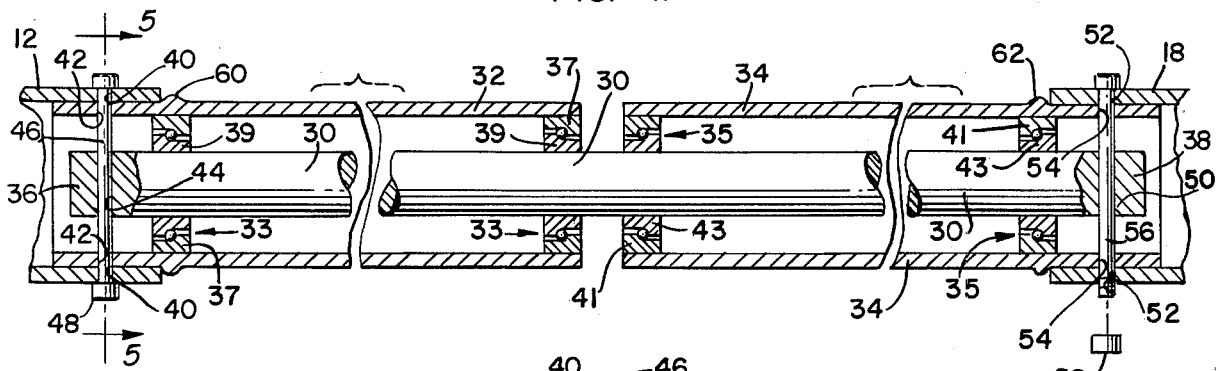
FIG. 4 is a view through section 4—4 in FIG. 3 on an enlarged scale.
Figure 5:
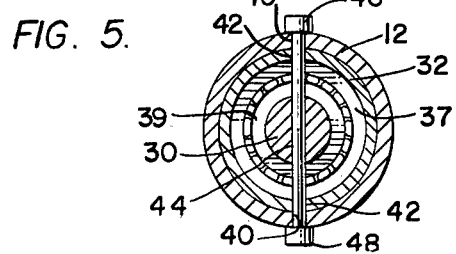
FIG. 5 is a view through section 5—5 in FIG. 4.

Details of modular drive unit 26 will be readily envisioned with reference to FIGS. 4 and 5 which shows unit 26 to comprise an elongate first member 30 of cylindrical cross section, a bearing sleeve member 32, and a bearing sleeve member 34. As assembled and incorporated to form modified propeller shaft 28, modular drive unit 26 further includes first and second bearing means 33, 35 in supporting relationship between elongate member 30 and sleeve members 32 and 34, respectively. Elongate member 30 includes a first end 36 that is at least partly coextensive with and extends within an adjacent end of portion 12 of original propeller shaft 10 which is hollow and a second end 38 that is at least partly coextensive with and extends within an adjacent end of portion 18 of original propeller shaft 10. Propeller shaft portion 12, which may for all intents and purposes also be referred to as an input portion since it receives drive from primary transmission 16, is formed with diametric apertures 40, while sleeve member 32 is formed with diametric apertures 42, and elongate member 30 is formed with a diametric or transversly extending bore 44 adjacent end 36. When apertures 40 and 42 and bore 44 are in alignment bolt or pin 46 may be inserted therethrough and secured by nut 48 to form lock means between input portion 12 and elongate shaft member 30. With the foregoing construction it is readily seen that input portion 12 and elongate shaft or rod member 30 may be selectively locked together or unlocked from each other depending upon whether bolt or pin 46 is disposed within aperture 40, apertures 42 and bore 44 and secured thereat by nut 48 or withdrawn bolt or pin 46 is withdrawn from apertures 40, apertures 42 and bore 44 by removing nut 48. Adjacent to the output portion end of elongate member 30 there is also provided a transversely extending bore 50, as are also additional diametric apertures 52 in output portion 18 and diametric apertures 54 in sleeve member 34. To secure elongate member 30 in driving relationship with output portion 18 bolt or pin 56 may be inserted into diametric apertures 52 and 54 and bore 50 and locked thereat by nut 58. Thus with elongate member 30 locked to both input portion 12 and output portion 18, for example, as described above with the respective pins 46, 56 and nuts 48, 58, the motor vehicle having the modified propeller shaft arrangement 28 illustrated in FIG. 3 may be driven in normal use or for purposes of exhibitions and demonstrations in antique car shows or rallies. As a matter of interest the modified shaft arrangement 28 illustrated in FIG. 3 has been installed and successfully operated at road speeds of up to 80 miles per hour. To facilitate assembly and limit depth of penetration of sleeve members 32 and 34 into input portion 12 and output portion 18, radially outward protrusions 60, 62 are formed on the periphery of sleeve members 32 and 34, respectively. To strengthen the assembly of sleeve members 32 and 34 with input and output portions 12 and 18, the respective portions may be welded to protrusions 60 and 62 at the contacting ends of input and output portions 12 and 18.

The bearing means between elongate member 30 and sleeve members 32 and 34, by way of example, include two axially spaced-apart bearing units 33, each of which includes an outer race 37 secured to the inner surface of sleeve member 32 and a cooperating inner race 39 secured on elongate shaft member 30. While the bearing units 33 are shown to be of the ball bearing type, they may be of any other conventional type including roller types. Similarly, a pair of axially spaced-apart bearing units 35 including outer and inner races 41, 43 are secured to sleeve member 34 and elongate shaft member 30, respectively. With the presence of the described bearing units 33, 35, it is clear that a free-wheeling condition between input and output portions 12 and 18 may be established by selectively removing one or both nuts 48, 58 after which either or both pins 46, 56 may be removed whereby elongate shaft member 30 may be free from rotation with either or both output portion 18 and input portion 12. With the driving relationship thus broken between input portion 12 and output portion 18, the vehicle may then be towed so that even with rotation of output portion 18 by the wheel axles 24, input portion and primary transmission 16 will not be driven.

Although the drive unit 26 as described is preassembled for modification of pre-existing propeller shaft to provide a modified shaft 28, it may be factory installed as original equipment as an option with automatic transmission vehicles.

Figure 6:
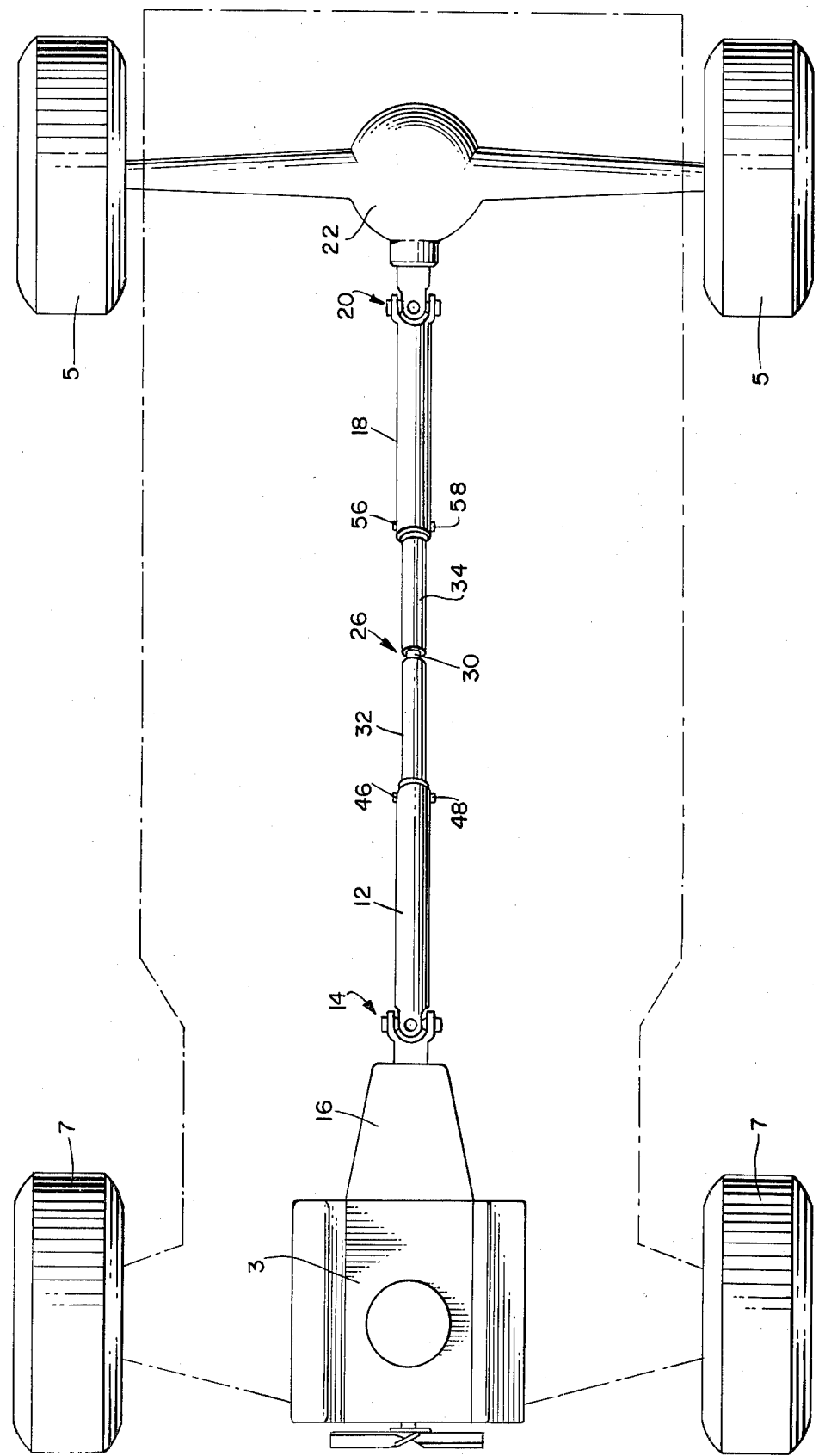
FIG. 6 is a plan view of a motor vehicle with the body omitted to show the drive unit of the present invention incorporated in the drive line between engine and the driven wheels.

For greater clarity reference is made to FIG. 6 which shows the drive unit 26 of the present invention incorporated in the drive line between the vehicle engine 3 and the driven wheels 5 which, for example, are the rear wheels of the vehicle. When elongate member 30 of drive unit 26 is connected up to input portion 12 by pin 46 and nut 48 and to output portion 18 by pin 56 and nut 58, it will be possible to drive the rear wheels 5 by engine 3 through primary transmission 16, universal joint 14, input portion 12, pin 46, elongate member 30, pin 56, output portion 18, universal joint 20, differential transmission 22, and axle portions 24 which are connected to rear wheels 5. Front wheels 7 are also shown to provide complete insight as to location of various parts of the present invention.

Although the invention has been described with a certain degree of particularity, it is understood that the present disclosure has been made only by way of example and the numerous changes in details of construction and the combination and arrangement of parts may be resorted to without departing from the spirit and scope of the invention as hereinafter claimed.

What is claimed is:

1. A propeller shaft arrangement for an automobile comprising:
   (a) an input portion in driving relationship with a change-spaced transmission;
   (b) an output portion spaced-apart from said input portion but in axial alignment therewith and in driving relationship with a differential transmission;
   (c) and an intermediate unit or portion extending in axial alignment with said input portion and said output portion;
   (d) said intermediate portion including an elongate first member extending for at least the full distance between adjacent ends of said input portion and said output portion so that opposite ends of said first member are each partly coextensive with one of said input and output portions;
   (e) said intermediate portion also including a second member and a third member wherein said second member is a bearing sleeve normally rigidly secured to said input portion and rotatable therewith, said third member is a bearing sleeve normally rigidly secured to said output portion, and rotatable therewith and said second and third members are structurally independent of each other;
   (f) first means for selectively locking and unlocking said first member to and from said input portion and said second member;
   (g) second means for selectively locking and unlocking said first member to and from said output portion and said third member whereby driving relationship is established between said input and output portions when said first and said second locking means are conditioned to lock said first member to both input portion and said output portion;
   (h) bearing means in supporting relationship between said first and second members and between said first and third members to maintain proper alignment and to effect free-wheeling relationship between said input and output portions when one of said first and second means is conditioned to unlock said input portion or said output portion from said first member.

2. The shaft arrangement as defined in claim 1 wherein said first member is an elongate rod or shaft of cylindrical form; said bearing means comprise a plurality of inner races secured on said first member and a plurality of outer races in rotatable relationship with and around said inner races; and said second and third members are tubular with each extending around a portion of said first member and having some of said outer races secured on the inner surface thereof.

3. The shaft arrangement as defined in claim 2 wherein said second and third members have remote ends thereof extending within said input portion and said output portio, respectively, whereby opposite ends of said first member are at least partly coextensive with said input portion and said second member and also at least partly coextensive with said output portion and said third member.

4. The shaft arrangement as defined in claim 3 wherein said first locking means comprise a first set of apertures in said input portion and said second member, a first transversly extending bore in said first member, and a pin or bolt extending through said apertures and bore and removably secured thereat.

5. The shaft arrangement as defined in claim 4 wherein said second locking means comprise second set of apertures in said output portion and said third member and a second transversely extending bore in said first member; and a second pin or bolt extending through said second set of apertures and said second bore and removably secured thereat.

6. A propeller shaft arrangement as defined in claim 5 wherein said second and third members each have a radially outwardly extending protrusion on the outer surface thereof adjacent to but at a short distance from one end whereby entry of said second and third members into said input or output portions is limited and further whereby secure attachment of said second and third members to said input and output portions by welding is facilitated.

7. A drive unit normally attached to portions of an automobile propeller shaft for selectively establishing drive relationship or free-wheeling relationship between propeller shaft portions as desired comprising:
   (a) an elongate first member extending at least the full distance between adjacent ends of portions of a propeller shaft;
   (b) a second member in the form of a bearing sleeve with first bearing means in supporting relationship between said second member and one part of said first member;
   (c) a third member in the form of a bearing sleeve with additional bearing means in supporting relationship between said third member and a second part of said first member;
   (d) first means selectively locking or unlocking said first member along with said second member to or from one portion of a propeller shaft;
   (e) second means selectively locking or unlocking said first member along with said third member to or from a second portion of a propeller shaft whereby free-wheeling between portions of a propeller shaft may be effected when either of said locking means are conditioned to unlock the parts associated therewith while a driving relationship may be established between parts of a propeller shaft when both of said locking means are conditioned to lock the parts associated therewith.

8. The unit as defined in claim 7 wherein said first member is rod or shaft of cylindrical form, said first bearing means comprise inner races secured on said first member and outer races in notatable relationship with and around said inner races, said additional bearing means comprise inner races secured on said first member and outer races in rotatable relationship with and around said inner races of said additional bearing means; and said second and third members are tubular with each extending around a portion of said first member and having said outer races of said first bearing means secured on the inner surface of said second member and said outer races of said additional bearings secured on the inner surface of said third member.

9. The unit as defined in claim 8 wherein said locking means comprise a transversely extending bore adjacent each end of said first member, apertures in said second and third members, and a pin or bolt extending through and removably secured in the bore adjacent each end of the first member and the respective apertures of said second and third members.

10. The unit as defined in claim 9 wherein said second and third members each have a radially outwardly extending protrusion on the outer periphery thereof adjacent to, but at a short distance from remote ends of said second and third members.

* * * * *